United States Patent
Chen et al.

(10) Patent No.: US 9,949,217 B2
(45) Date of Patent: Apr. 17, 2018

(54) TRANSMIT POWER CONTROL METHOD AND SYSTEM IN MOBILE COMMUNICATIONS DEVICE

(71) Applicant: MediaTek Singapore Pte. Ltd., Singapore (SG)

(72) Inventors: Hsin-Hung Chen, Hsinchu (TW); Yangjian Chen, Kent (GB); Paul Muller, Kent (GB); Hsiang-Hui Chang, Miaoli (TW); Bernard Mark Tenbroek, Kent (GB)

(73) Assignee: MEDIATEK SINGAPORE PTE. LTD., Fusionopolis Walk (SG)

( * ) Notice: Subject to any disclaimer, the term of this patent is extended or adjusted under 35 U.S.C. 154(b) by 0 days.

(21) Appl. No.: 14/884,998

(22) Filed: Oct. 16, 2015

(65) Prior Publication Data
US 2016/0112958 A1 Apr. 21, 2016

Related U.S. Application Data

(60) Provisional application No. 62/065,831, filed on Oct. 20, 2014.

(51) Int. Cl.
*H04W 72/00* (2009.01)
*H04W 52/52* (2009.01)

(52) U.S. Cl.
CPC .................................. *H04W 52/52* (2013.01)

(58) Field of Classification Search
CPC ..... H04W 24/08; H04W 24/10; H04W 24/02; H04W 52/242; H04W 72/0446; H04W 72/085; H04W 16/14
USPC ............. 455/67.11, 67.14, 115.1, 115.2, 450
See application file for complete search history.

(56) References Cited

U.S. PATENT DOCUMENTS

| | | | |
|---|---|---|---|
| 8,326,340 B2 | 12/2012 | Nalbantis et al. | |
| 8,467,811 B2 * | 6/2013 | Rofougaran | G01S 19/49 257/678 |
| 2008/0304603 A1 * | 12/2008 | Wang | H03G 3/005 375/345 |
| 2009/0196223 A1 * | 8/2009 | Nalbantis | H04W 52/08 370/328 |

FOREIGN PATENT DOCUMENTS

WO   WO 2013013377 A1 *   1/2013   ............ H04W 52/52

* cited by examiner

*Primary Examiner* — Ronald Eisner
(74) *Attorney, Agent, or Firm* — McClure, Qualey & Rodack, LLP

(57) ABSTRACT

A method of transmit power control in a mobile telecommunications device is provided. One of a plurality of signal paths providing different output power and different gains is assigned in a first gain adjustment and a first power measurement in a current time slot. The same one of the signal paths is assigned in at least a second gain adjustment and a second power measurement in the same current time slot.

19 Claims, 5 Drawing Sheets

TRANSMIT POWER CONTROL METHOD AND SYSTEM IN MOBILE COMMUNICATIONS DEVICE

This application claims priority to U.S. provisional application Ser. No. 62/065,831, filed Oct. 20, 2014, the disclosure of which is incorporated by reference herein in its entirety.

TECHNICAL FIELD

The disclosure relates in general to a transmit power control method and system in a mobile telecommunications device.

BACKGROUND

Mobile telecommunications devices, such as smart phones, have an important role in people life. In order to meet the transmitter power control specifications, in general, the mobile telecommunications devices are required to communicate with the base station and the signals from the mobile telecommunications devices to the base station should have substantially the same power level. If this is not the case, then those signals with greater intensity become on-channel interferers for those signals of reduced intensity.

In general, the gain of the transmitter in the mobile telecommunications device varies with transmit frequency, ambient and die temperature, supply voltage and fabrication process tolerances. However the mobile telecommunications devices are required to change the output power in predetermined step sizes in response to instructions from the base station. Typically the mobile telecommunications devices are expected to be able to make 1 dB changes in output power with 0.5 dB accuracy, and 10 dB step changes in power with 2 dB accuracy, which is also called as an inner loop power control accuracy. The inner loop power control is defined as the relative power difference between the mean power of the original (reference) time slot and the mean power of the target time slot.

Thus, how to improve the transmission power control accuracy of the mobile communication devices becomes a main task.

SUMMARY

The disclosure is directed to a transmit power control method and system in a mobile communications device, which may prevent additional gain error in gain adjustment and may reduce power consumption for meeting the transmission power control accuracy required by the transmitter power control specifications.

According to one embodiment, a method of transmit power control in a mobile telecommunications device is provided. One of a plurality of signal paths providing different output power and/or different gains is assigned in a first gain adjustment and a first power measurement in a current time slot. The same one of the signal paths is assigned in at least a second gain adjustment and a second power measurement in the same current time slot.

According to another embodiment, a transmit power control system in a mobile telecommunications device is provided. The transmit power control system includes: a plurality of signal paths; a power measurement unit, coupled to the signal paths; and a gain adjustment unit, coupled to the signal paths and the power measurement unit. The gain adjustment unit assigns one of a plurality of signal paths providing different output power and/or different gains in a first gain adjustment and a first power measurement in a current time slot. The gain adjustment unit assigns the same one of the signal paths in at least a second gain adjustment and a second power measurement in the same current time slot.

Figure 1:
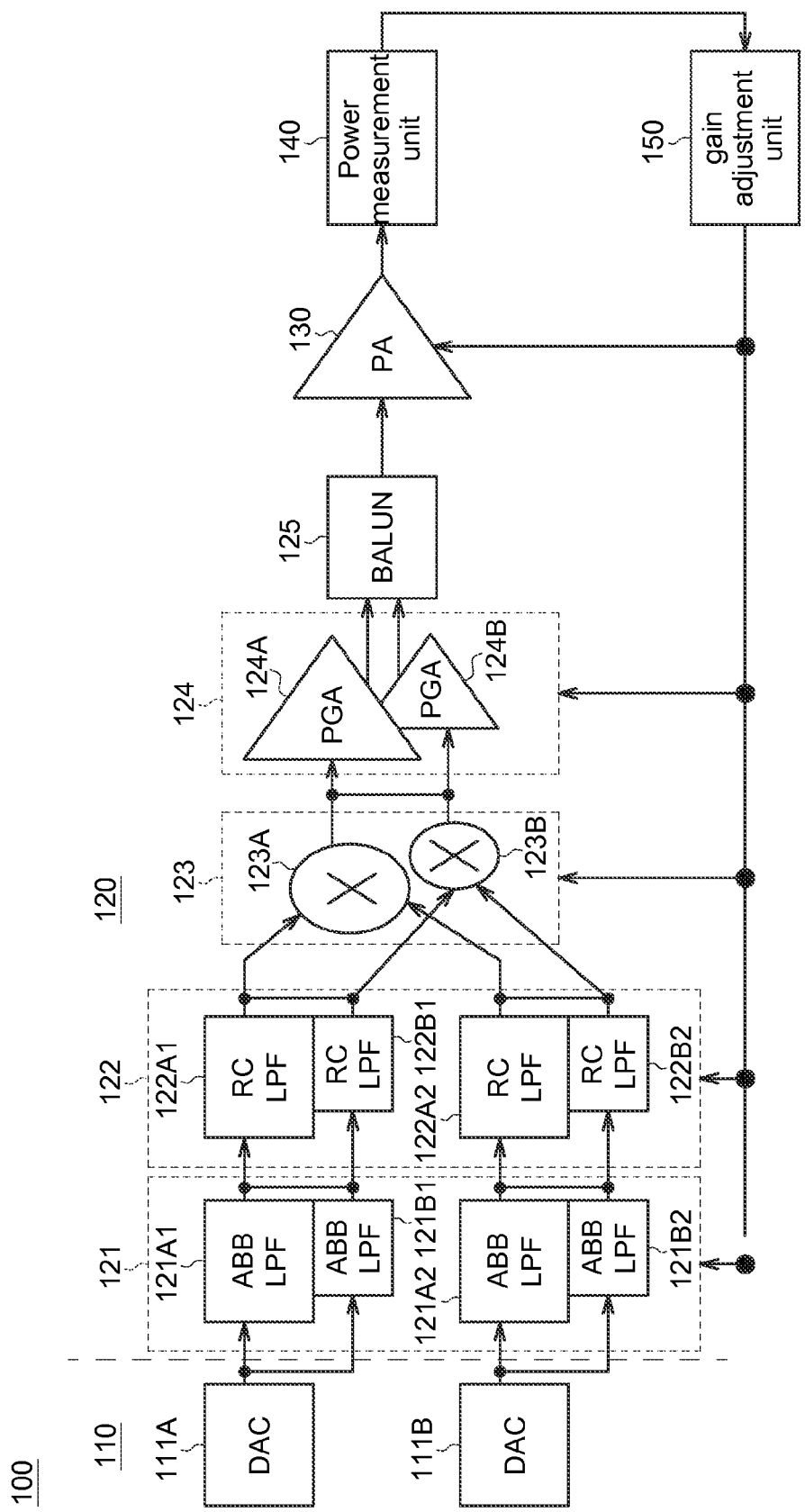
FIG. 1 shows a simplified functional block diagram of the transmit portion of a mobile communications device according to an embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms of the disclosure are based on general definition in the technical field of the disclosure. If the disclosure describes or explains one or some terms, definition of the terms is based on the description or explanation of the disclosure. Each of the disclosed embodiments has one or more technical features. However, it does not mean that implementation of the disclosure needs every technical feature of any embodiment of the disclosure or combination of the embodiments of the disclosure is prohibited. In other words, in possible implementation, one skilled person in the art would selectively implement part or all technical features of any embodiment of the disclosure or selectively combine part or all technical features of the embodiments of the disclosure. In the following description and claims, the term "coupling" refers to directly connection or indirectly connection.

FIG. 1 shows a simplified functional block diagram of the transmit portion of a mobile communications device (such as a mobile telephone) according to an embodiment of the application. As shown in FIG. 1, the transmit power control system (not shown) of the mobile communications device 100 at least includes: a digital base-band processing circuit (DBB) 110, an RF transmitter 120, a power amplifier (PA) circuit 130, a power measurement unit 140 and a gain adjustment unit 150. The power measurement unit 140 and the gain adjustment unit 150 may be implemented by hardware, and/or software.

The signal to be transmitted, whether that is speech or data, has already been encoded and spread by multiplication with a spreading code used by the DBB 110. The structure of the DBB 110 is well known to the person skilled in the art. The output of the DBB 110 may be sent for up-conversion within the RF transmitter 120. Further, the DBB 110 may include two DACs (digital-to-analog converters) 111A and 111B, and thus the output of the DBB 110 is analog signal.

However, in other possible implementations, the DACs may be included in the RF transmitter 120 (rather than in the DBB 110) and thus the output of the DBB 110 is digital signal.

The RF transmitter 120 may include an ABB (analog baseband) LPF (low pass filter) portion 121, a RC LPF portion 122, a mixer portion 123, a programmable gain amplifier (PGA) portion 124 and a Balun (balance-to-unbalance) 125. In other possible implementations of the application, the Balun 125 may be disposed outside the RF transmitter 120. In other possible implementations of the application, the PA circuit 130 may be included in the RF transmitter 120.

The ABB LPF portion 121 may include a plurality of ABB LPFs, for example, ABB LPF 121A1, ABB LPF 121B1, ABB LPF 121A2, and ABB LPF 121B2. Gains of the ABB LPFs 121A1-121B2 may be adjustable. The ABB LPFs 121A1 and 121A2 may provide higher power and higher gain than the ABB LPFs 121B1 and 121B2. The ABB LPF is used to suppress noise from the DAC.

The RC LPF portion 122 may include a plurality of RC LPFs, for example, RC LPF 122A1, RC LPF 122B1, RC LPF 122A2, and RC LPF 122B2. Gains of the RC LPFs 122A1-122B2 may be adjustable. The RC LPFs 122A1 and 122A2 may provide higher power and higher gain than the RC LPFs 122B1 and 122B2. The RC LPF is used to suppress noise from the ABB LPF.

The mixer portion 123 may include a plurality of mixers, for example, mixers 123A and 123B. Gains of the mixers 123A and 123B may be adjustable. The mixer 123A may provide higher power and higher gain than the mixer 123B.

The PGA portion 124 may include a plurality of PGAs, for example, PGAs 124A and 124B. Gains of the PGAs 124A and 124B may be adjustable. The PGA 124A may provide higher power and higher gain than the PGA 124B.

The power measurement unit 140 is coupled to the PA circuit 130, for measuring the power of the mobile communications device 100. The gain adjustment unit 150 is coupled to the DBB 110, the RF transmitter 120, the PA circuit 130 and/or the power measurement unit 140, for adjusting the gains of the RF transmitter 120, and/or the PA circuit 130.

In the embodiment of the application, there are a plurality of signal paths in the mobile communications device 100. Although two parallel signal paths are shown in FIG. 1, the application is not limited thereby. Among the two signal paths in FIG. 1, one signal path is for providing high output power while the other signal path is for providing low output power. For example, the output signal from the DAC 111A may pass through either the ABB LPF 121A1 (in higher power) or the ABB LPF 121B1 (in low power); and similarly, the output signal from the ABB LPF portion 121 pass through either the RC LPF 122A1 (in higher power) or the RC LPF 122B1 (in low power), and so on. The power region of the high power signal path and the low power signal path may be overlapped or non-overlapped.

Details of the inner loop power control of the mobile communications device 100 according to an embodiment of the application are described as follows. In the embodiment of the application, in order for the inner loop power control, two gain adjustments and two power measurements are performed in a single time slot N (N being a natural number). A time slot refers to a time interval in signal transmission. The time domain is divided into several time slots of fixed length, one for each sub-channel. A sample data block of sub-channel 1 is transmitted during time slot 1, sub-channel 2 during time slot 2, and etc. The first power measurement in the current time slot is used to be the reference for the second gain adjustment in the same current time slot. The second power measurement in the current time slot is used to be the reference for the first gain adjustment in the next time slot. Of course, there may be more than two gain adjustments and/or more than two power measurement in a single time slot, which are still in the scope and the spirit of the application.

In the embodiment of the application, there are two criteria in the inner loop power control. Details of the criteria are as follows.

Criteria 1: the Signal Path is not Switched in the Same Time Slot

Figure 2B:
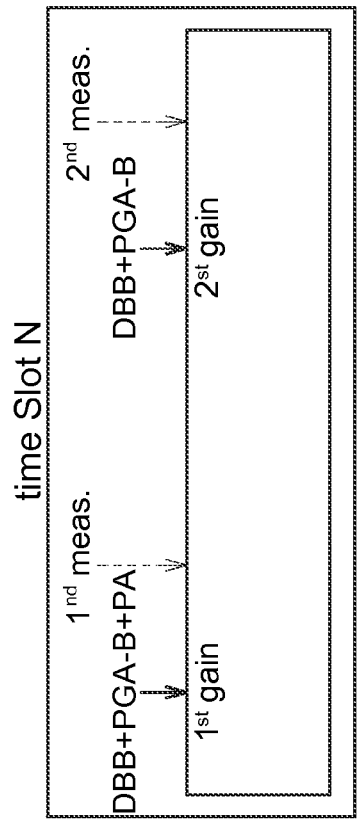
FIG. 2A and FIG. 2B show the inner loop power control in the same time slot in the mobile communications device according to two embodiments of the application.
Figure 2A:
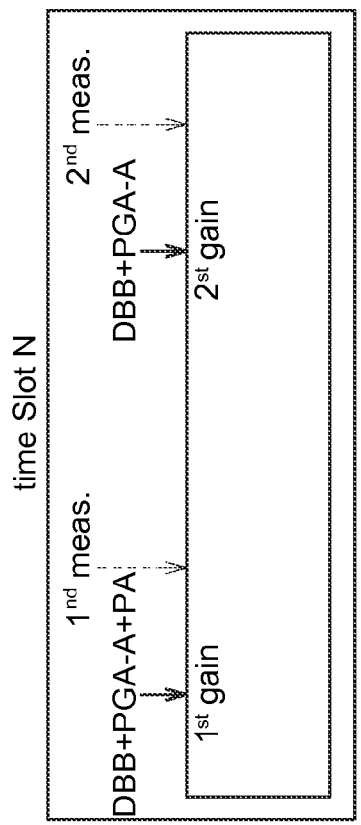

FIG. 2A and FIG. 2B show the inner loop power control in the same time slot in the mobile communications device 100 according to two embodiments of the application. For example, as shown in FIG. 2A, a first gain adjustment is performed on the DBB 110, the PGA 124A and the PA circuit 130 (that is to say, the gains of the DBB 110, the PGA 124A and the PA circuit 130 are adjusted respectively); and a first power measurement is performed to measure the gain provided from the DBB 110, the PGA 124A and the PA circuit 130. Then, a second gain adjustment is performed on the DBB 110 and the PGA 124A (that is to say, the gains of the DBB 110 and the PGA 124A are adjusted respectively); and a second power measurement is performed to measure the gain from the DBB 110, the PGA 124A and the PA circuit 130. Details of the operations of FIG. 2B are similar, and thus are omitted here.

That is to say, in the embodiment of the application, in the same time slot, the signal path is not switched, in order to prevent additional gain error. Thus, in the embodiment of the application, the criteria 1 is that: during the same time slot, the signal path is not switched, that is, the first gain adjustment and the second gain adjustment use the same signal path. As shown in FIGS. 2A and 2B, in the second gain adjustment, the signal passes through the DBB, the PGA 124A (or the PGA 124B in FIG. 2B) and the PA. Thus, if the PGA 124A is used in the first gain adjustment in the current time slot N, then the PGA 124A is still used in the second gain adjustment in the current time slot N. Similarly, if the PGA 124B is used in the first gain adjustment in the current time slot N, then the PGA 124B is still used in the second gain adjustment in the current time slot N.

Although in the above description, the PGA is taken as an example, the application is not limited. For example, the ABB LPF, the RC LPF, and/or the mixer may be also used in the gain adjustment. That is, if the ABB LPF 121A1 is used in the first gain adjustment in the current time slot N, then the ABB LPF 121A1 is still used in the second gain adjustment in the current time slot N. Similarly, if the ABB LPF 121B1 is used in the first gain adjustment in the current time slot N, then the ABB LPF 121B2 is still used in the second gain adjustment in the current time slot N.

Criteria 2: Whether the Signal Path Switches or not Between Two Adjacent Time Slots In some situation, the signal path may be switched between two adjacent time slots. For example, in the current slot, a high output power (or a low output power) is output, while in the next slot, a low output power (or a high output power) is desired. In the embodiment of the application, between two adjacent time slots, whether the signal path switch is performed or not may be determined based on another criteria.

FIG. 3-FIG. 6 show the inner loop power control in two adjacent time slots in the mobile communications device 100 according to the embodiment of the application.

Criteria 2A (Sweeping Down): Whether to Switch from a High Power Signal Path to a Low Power Signal Path Between Two Adjacent Time Slots In the embodiment, the term "sweeping down" refers to switch the signal path from a high power signal path to a low power signal path during time slot transition.

Figure 3:
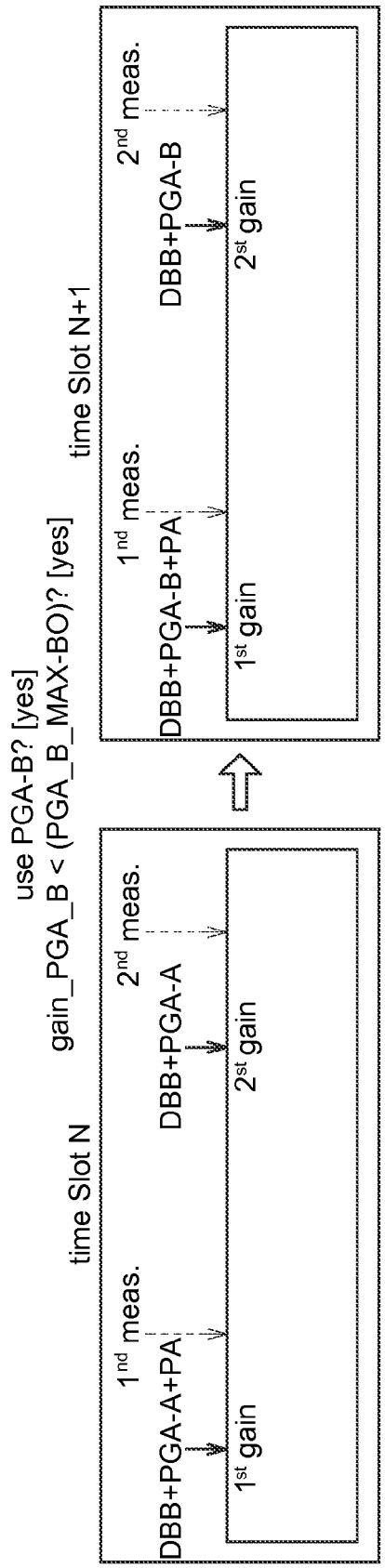
FIG. 3-FIG. 6 show the sweeping up and the sweeping down in the inner loop power control in two adjacent time slots in the mobile communications device according to the embodiment of the application.

As shown in FIG. 3, in the current time slot N, the first gain adjustment is performed on the DBB 110, the PGA 124A and the PA circuit 130 (that is to say, the gains of the DBB 110, the PGA 124A and the PA circuit 130 may be adjusted respectively); and the first power measurement is performed to measure the gain provided from the DBB 110, the PGA 124A and the PA circuit 130. In the current time slot N, the second gain adjustment is performed on the DBB 110 and the PGA 124A (that is to say, the gains of the DBB 110 and the PGA 124A are adjusted respectively) which meet the criteria 1; and the second power measurement is performed to measure the gain provided from the DBB 110, the PGA 124A and the PA circuit 130.

However, if the required power in the next time slot N+1 is low and may be enough provided by the PGA 124B, then another criteria is determined. In this situation, whether the gain of the PGA 124B is lower than a gain maximum PGA_B_MAX by a gain cover threshold BO is determined (i.e. whether gain_PGA_B<(PGA_B_MAX−BO) is determined). The gain maximum PGA_B_MAX refers to the gain maximum provided by the PGA 124B. The gain cover threshold BO refers to the total allowable gain error of the PA circuit 130 and the PGA 124B in the first gain adjustment in the next time slot N+1 and the gain cover threshold BO is to be covered by the PGA 124B in the second gain adjustment in the next time slot N+1. The reason to determine whether the gain of the PGA 124B is lower than the gain maximum PGA_B_MAX by the gain cover threshold BO relies on that, if the total gain error of the PA circuit 130 and the PGA 124B in the first gain adjustment in the next time slot N+1 is larger than the gain cover threshold BO, then in the second gain adjustment in the next time slot N+1, the PGA 124B would be forced to be saturated to cover the high gain error. In other words, if the total gain error of the PA circuit 130 and the PGA 124B in the first gain adjustment in the next time slot N+1 is larger than the gain cover threshold BO, then in the second gain adjustment in the next time slot N+1, the gain of the PGA 124B should be adjusted to a large gain for covering this high gain error (which may cause the PGA 124B to be operated in a saturation status).

Thus, in the embodiment of the application, if (1) the required power in the next time slot N+1 is low and enough provided by the PGA 124B, and (2) the gain of the PGA 124B is lower than the gain maximum PGA_B_MAX by the gain cover threshold BO (i.e. the low power PGA is enough in covering the gain error), then in the next time slot N+1, the signal path is switched from the PGA 124A to the PGA 124B for reducing power consumption, as shown in FIG. 3. Thus, in the next time slot N+1, the first gain adjustment is performed on the DBB 110, the PGA 124B and the PA circuit 130 (that is to say, the gains of the DBB 110, the PGA 124B and the PA circuit 130 may be adjusted respectively); and the first power measurement is performed to measure the gain provided from the DBB 110, the PGA 124B and the PA circuit 130. In the next time slot N+1, the second gain adjustment is performed on the DBB 110 and the PGA 124B (that is to say, the gains of the DBB 110 and the PGA 124B are adjusted respectively); and the second power measurement is performed to measure the gain provided from the DBB 110, the PGA 124B and the PA circuit 130.

Figure 4:
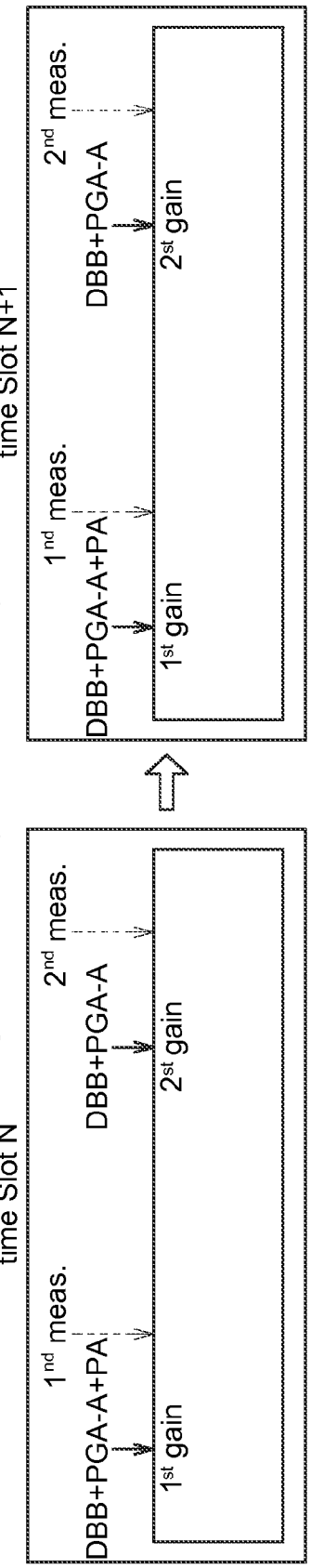

On the contrary, in the embodiment of the application, if (1) the required power in the next time slot N+1 is low and enough provided by the PGA 124B, and (2) the gain of the PGA 124B is not lower than the gain maximum PGA_B_MAX by the gain cover threshold BO (that is, gain_PGA_B is higher than (PGA_B_MAX−BO)), then in the next time slot N+1, the signal path is not switched, as shown in FIG. 4. That is because the low power/low gain PGA 124B is not enough to cover the gain error. Thus, in the next time slot N+1, the first gain adjustment is still performed on the DBB 110, the PGA 124A and the PA circuit 130 (that is to say, the gains of the DBB 110, the PGA 124A and the PA circuit 130 may be adjusted respectively); and the first power measurement is performed to measure the gain provided from the DBB 110, the PGA 124A and the PA circuit 130. In the next time slot N+1, the second gain adjustment is performed on the DBB 110 and the PGA 124A (that is to say, the gains of the DBB 110 and the PGA 124A are adjusted respectively); and the second power measurement is performed to measure the gain provided from the DBB 110, the PGA 124A and the PA circuit 130.

Criteria 2B (Sweeping Up): Whether to Switch from a Low Power Signal Path to a High Power Signal Path Between Two Adjacent Time Slots In the embodiment, the term "sweeping up" refers to switch the signal path from a low power signal path to a high power signal path during time slot transition.

Figure 5:
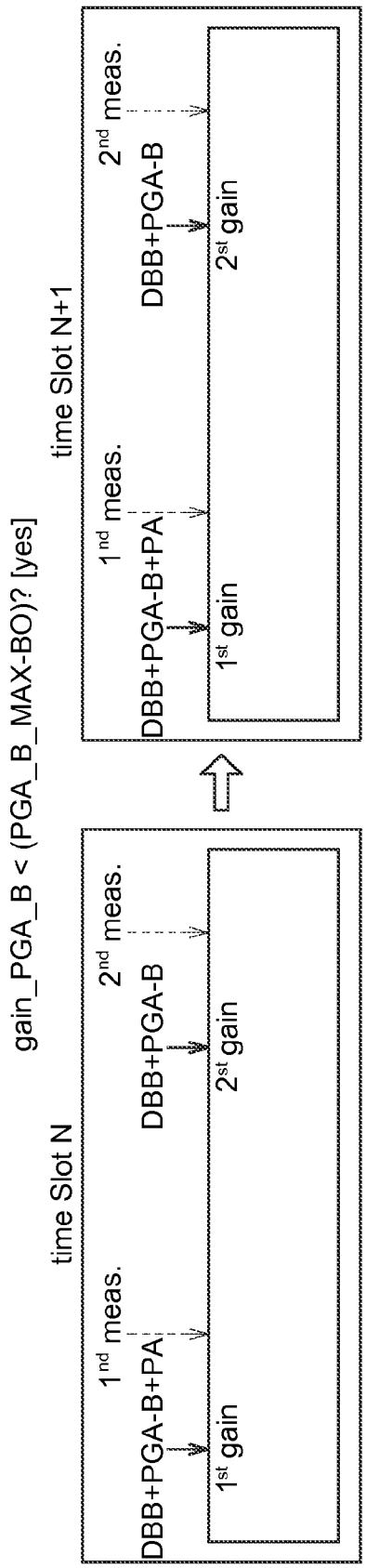

As shown in FIG. 5, in the current time slot N, the first gain adjustment is performed on the DBB 110, the PGA 124B and the PA circuit 130 (that is to say, the gains of the DBB 110, the PGA 124B and the PA circuit 130 may be adjusted respectively); and the first power measurement is performed to measure the gain provided from the DBB 110, the PGA 124B and the PA circuit 130. In the current time slot N, the second gain adjustment is performed on the DBB 110 and the PGA 124B (that is to say, the gains of the DBB 110 and the PGA 124B are adjusted respectively); and the second power measurement is performed to measure the gain provided from the DBB 110, the PGA 124B and the PA circuit 130.

If (1) the required power in the next time slot N+1 is low and enough provided by the PGA 124B, and (2) the gain of the PGA 124B is lower than the gain maximum PGA_B_MAX by the gain cover threshold BO, then in the next time slot N+1, the signal path still uses the PGA 124B, as shown in FIG. 5. Thus, in the next time slot N+1, the first gain adjustment is performed on the DBB 110, the PGA 124B and the PA circuit 130 (that is to say, the gains of the DBB 110, the PGA 124B and the PA circuit 130 may be adjusted respectively); and the first power measurement is performed to measure the gain provided from the DBB 110, the PGA 124B and the PA circuit 130. In the next time slot N+1, the second gain adjustment is performed on the DBB 110 and the PGA 124B (that is to say, the gains of the DBB 110 and the PGA 124B are adjusted respectively); and the second power measurement is performed to measure the gain provided from the DBB 110, the PGA 124B and the PA circuit 130.

Figure 6:
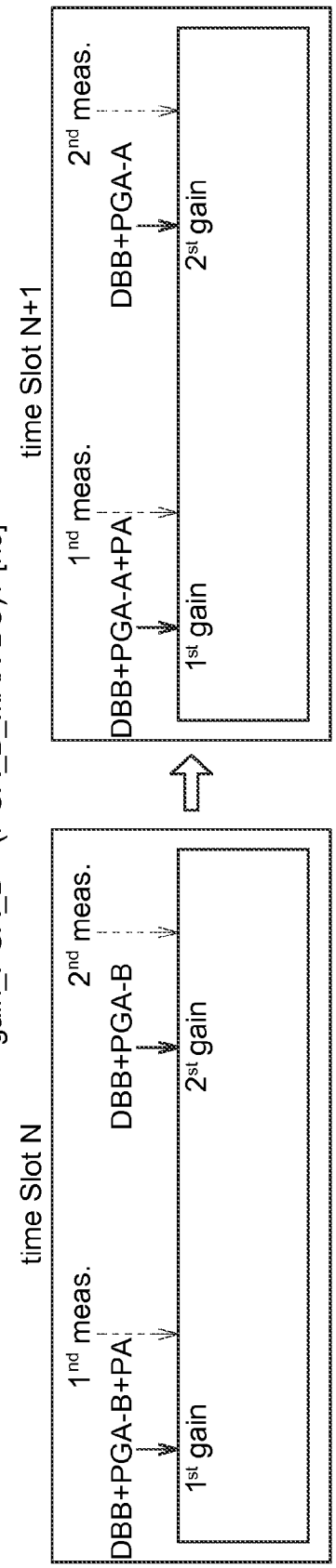

On the contrary, in the embodiment of the application, if (1) the required power in the next time slot N+1 is low and enough provided by the PGA 124B, but (2) the gain of the PGA 124B is not lower than the gain maximum PGA_B_MAX by the gain cover threshold BO (that is, gain_PGA_B is higher than (PGA_B_MAX−BO), which means the PGA 124B in the second gain adjustment cannot cover the total gain error of the PGA 124B and the PA circuit 130 in the first adjustment), then in the next time slot N+1, the signal path is switched from the PGA 124B to the PGA 124A (to cover the gain error), as shown in FIG. 6. Thus, in the next time slot N+1, the first gain adjustment is performed on the DBB 110, the PGA 124A and the PA circuit 130 (that is to say, the gains of the DBB 110, the PGA 124A and the PA circuit 130 may be adjusted respectively); and the first power measurement is performed to measure the gain provided from the DBB 110, the PGA 124A and the PA circuit 130. In the next time slot N+1, the second gain adjustment is performed on the DBB 110 and the PGA 124A (that is to say, the gains of the DBB 110 and the PGA 124A are adjusted respectively); and the second power measurement is performed to measure the gain provided from the DBB 110, the PGA 124A and the PA circuit 130.

Still further, the power range covered by the high power signal path (for example, the PGA-A) may be non-overlapped or partially overlapped with the power range covered by the low power signal path (for example, the PGA-B).

In summary, in the embodiment of the application, in the same time slot, the signal path is not switched, in order to prevent additional gain error. During the time slot transition, whether the signal path is switched or not is determined based on (1) whether to sweep up or to sweep down; and (2) whether the gain of the PGA 124B is lower than a gain maximum PGA_B_MAX by a gain cover threshold BO (i.e. in the second/subsequent gain adjustment, whether or not the low power signal path is enough to cover the gain error caused in the first/previous gain adjustment).

Figure 7:
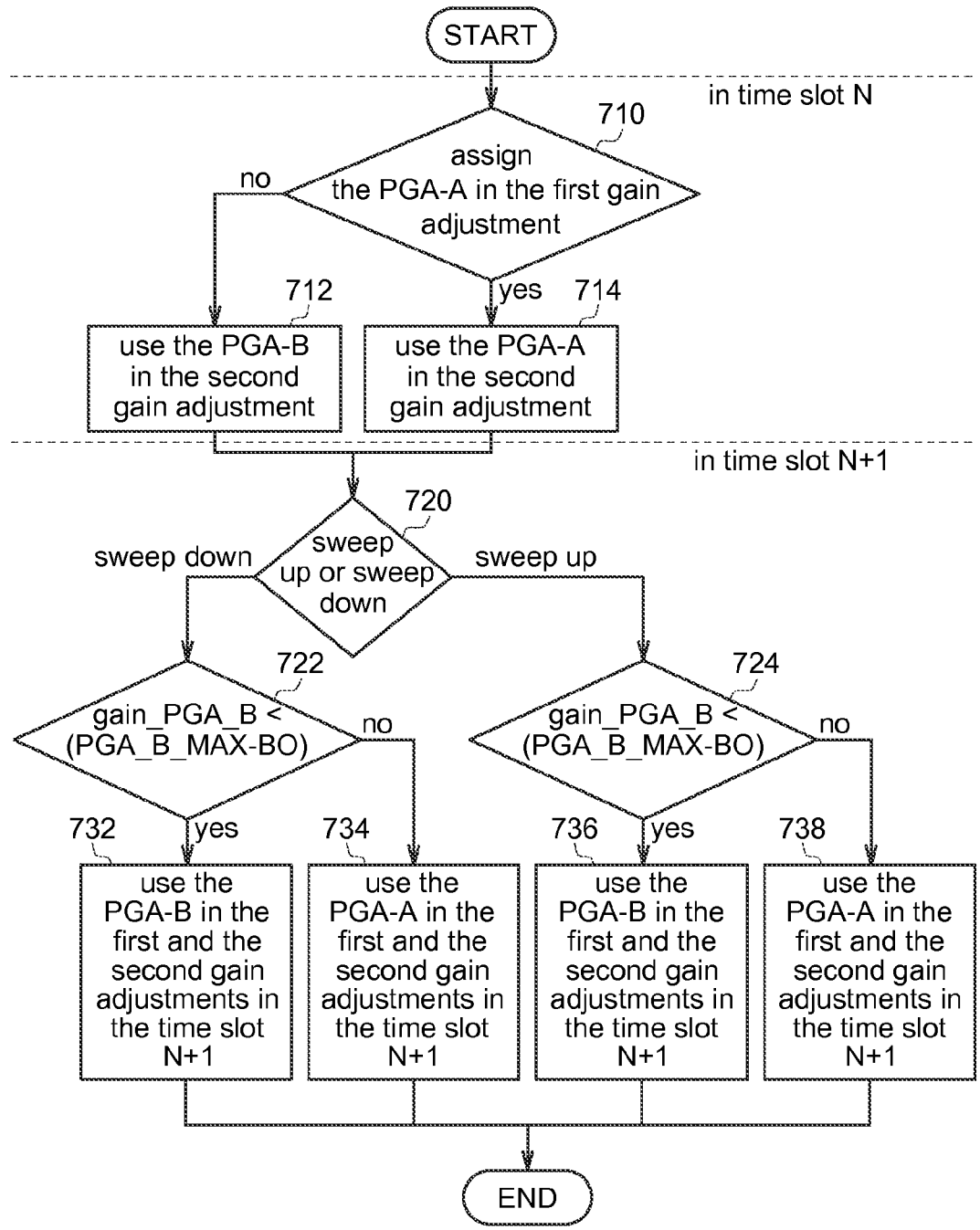
FIG. 7 shows a flow chart of the transmit power control according to an embodiment of the application.

FIG. 7 shows a flow chart of the transmit power control according to an embodiment of the application. As shown in FIG. 7, in the time slot N, in step 710, whether the PGA-A (for example, the PGA 124A) is assigned in the first gain adjustment is determined. If yes in step 710, then the PGA-A is used in the second gain adjustment in the time slot N (which meets the first criteria), as shown in step 714. On the contrary, in no in step 710 (which means the PGA-B (for example, the PGA 124B) is assigned in the first gain adjustment), then the PGA-B is used in the second gain adjustment in the time slot N (which meets the first criteria), as shown in step 712.

In the next time slot N+1, whether to sweep up or to sweep down or no action (to fix gain) is determined, as shown in step 720. In the case of sweeping down, whether the gain of the PGA-B is lower than the gain maximum PGA_B_MAX by the gain cover threshold BO (that is, whether gain_PGA_B is lower than (PGA_B_MAX−BO)) is determined, as shown in step 722. If yes in step 722, then the PGA-B is used in the first and the second gain adjustments in the time slot N+1, as shown in step 732. On the contrary, if no in step 722, then the PGA-A is used in the first and the second gain adjustments in the time slot N+1, as shown in step 734.

In the case of sweeping up, whether the gain of the PGA-B is lower than the gain maximum PGA_B_MAX by the gain cover threshold BO (that is, whether gain_PGA_B is lower than (PGA_B_MAX−BO)) is determined, as shown in step 724. If yes in step 724, then the PGA-B is used in the first and the second gain adjustments in the time slot N+1, as shown in step 736. On the contrary, if no in step 724, then the PGA-A is used in the first and the second gain adjustments in the time slot N+1, as shown in step 738.

Although in the above description, the signal path switch between the higher power PGA and the low power PGA is taken as an example, the embodiment is not limited by this. In other possible embodiments of the application, the signal path switch between the high power ABB LPF (for example, the ABB LPF 121A1) and the low power ABB LPF (for example, the ABB LPF 121B1), and/or the signal path switch between the high power RC LPF (for example, the RC LPF 122A1) and the low power RC LPF (for example, the RC LPF 122B1), and/or the signal path switch between the high power mixer (for example, the mixer 123A) and the low power mixer (for example, the mixer 123B) are also possible and thus the details of the signal path switching thereof are omitted. Still further, in other possible example of the application, more concurrent signal path switching is also possible. For example, at least two of the PGA and, the mixer, the RC LPF and the ABB LPF may be concurrently switched (that is to say, for example, in the current time slot, the high power/gain PGA and mixer (the PGA 124A and the mixer 123A) are assigned while in the next time slot, the low power/gain PGA and mixer (the PGA 124B and the mixer 123B are assigned). This is still within the spirit and the scope of the application.

Besides, the initial signal path of the initial time slot 0 may be determined based on the required output power.

As described above, in the embodiment of the application, power consumption is reduced because the signal path may be switched during time slot transition.

Further, in the embodiment of the application, additional gain/power error in the same time slot is prevented because the signal path is not switched in the same time slot transition.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of transmit power control in a mobile telecommunications device, the method including:
   providing a first signal path and a second signal path in the mobile telecommunications device, wherein the first signal path provides a first output power and a first gain, the second signal path provides a second output power and a second gain;
   in a current time slot, assigning one of the first and the second signal paths in the mobile telecommunications device for a first gain adjustment and a first output power measurement, wherein the first gain adjustment and the first output power measurement are performed on an output signal generated by the mobile telecommunications device in the current time slot; and
   in the same current time slot, assigning the same one of the first and the second signal paths in the mobile telecommunications device for at least a second gain adjustment and a second output power measurement, wherein the second gain adjustment and the second output power measurement are performed on the output signal in the current time slot,
   wherein in the same current time slot, the first gain adjustment and the first output power measurement in the mobile telecommunications device are performed before the second gain adjustment and the second output power measurement in the mobile telecommunications device.

2. The method of transmit power control according to claim 1, further including:
   if in the current time slot, the first signal path is assigned where the first gain adjustment, the first output power measurement, the second gain adjustment and the second output power measurement take place, determining whether the second output power provided by the second signal path achieves a target power required in a next time slot; and if the second output power provided by the second signal path achieves the target power required in the next time slot, further determining whether the second gain provided by the second signal path is lower than (Gmax−BO), wherein Gmax refers to a second gain maximum of the second signal path, and BO refers to a total gain error in the first gain adjustment.

3. The method of transmit power control according to claim 2, further including:

if the second gain provided by the second signal path is determined to be lower than (Gmax−BO), then assigning the second signal path in the next time slot for the first gain adjustment, the first output power measurement, the second gain adjustment and the second output power measurement.

4. The method of transmit power control according to claim 2, further including:

if the second gain provided by the second signal path is determined to be not lower than (Gmax−BO), then assigning the first signal path in the next time slot for the first gain adjustment, the first output power measurement, the second gain adjustment and the second output power measurement.

5. The method of transmit power control according to claim 1, further including:

if in the current time slot, the second signal path is assigned where the first gain adjustment, the first output power measurement, the second gain adjustment and the second output power measurement take place, then determining whether the second gain provided by the second signal path is lower than (Gmax−BO), wherein the second output power and the second gain provided by the second signal path are lower than the first output power and the first gain provided by the first signal path, respectively, and Gmax refers to a second gain maximum of the second signal path, and BO refers to a total gain error in the first gain adjustment.

6. The method of transmit power control according to claim 5, further including:

if the second gain provided by the second signal path is determined to be lower than (Gmax−BO), then assigning the second signal path in the next time slot for the first gain adjustment, the first output power measurement, the second gain adjustment and the second output power measurement.

7. The method of transmit power control according to claim 5, further including:

if the second gain provided by the second signal path is determined to be not lower than (Gmax−BO), then assigning the first signal path in the next time slot for the first gain adjustment, the first output power measurement, the second gain adjustment and the second output power measurement.

8. The method of transmit power control according to claim 2, wherein, the step of determining whether the second gain provided by the second signal path is lower than (Gmax−BO) comprises:

determining whether the second gain of the second signal path in the second gain adjustment in the next time slot is lower than a gain maximum by a gain cover threshold, wherein the gain maximum refers to a gain maximum provided by the second signal path and the gain cover threshold refers to a total allowable gain error in the first gain adjustment in the next time slot.

9. The method of transmit power control according to claim 8, wherein, if the second gain of the second signal path in the second gain adjustment in the next time slot is lower than the gain maximum by the gain cover threshold, determining that the second gain provided by the second signal path is lower than (Gmax−BO); and if the gain of the second signal path in the second gain adjustment in the next time slot is not lower than the gain maximum by the gain cover threshold, determining that the second gain provided by the second signal path is not lower than (Gmax−BO).

10. A transmit power control system in a mobile telecommunications device, the transmit power control system including:

a first signal path and a second signal path, wherein the first signal path provides a first output power and a first gain, the second signal path provides a second output power and a second gain;

a power measurement circuit, coupled to the first and the second signal paths; and a gain adjustment circuit, coupled to the first and the second signal paths and the power measurement circuit;

wherein in a current time slot, the gain adjustment circuit assigns one of the first and the second signal paths for a first gain adjustment and a first output power measurement; and in the same current time slot, the gain adjustment circuit assigns the same one of the first and the second signal paths for at least a second gain adjustment and a second output power measurement, wherein in the same current time slot, the first gain adjustment and the first output power measurement in the mobile telecommunications device are performed before the second gain adjustment and the second output power measurement in the mobile telecommunications device.

11. The transmit power control system according to claim 10, wherein:

if in the current time slot, the first signal path is assigned where the first gain adjustment, the first output power measurement, the second gain adjustment and the second output power measurement take place, the transmit power control system determines whether the second output power provided by the second signal path achieves a target power required in a next time slot; and if the second output power provided by the second signal path achieves the target power required in the next time slot, the transmit power control system further determines whether the second gain provided by the second signal path is lower than (Gmax−BO), wherein Gmax refers to a second gain maximum of the second signal path, and BO refers to a total gain error in the first gain adjustment.

12. The transmit power control system according to claim 11, wherein:

if the second gain provided by the second signal path is determined to be lower than (Gmax−BO), the gain adjustment circuit assigns the second signal path in the next time slot for the first gain adjustment, the first output power measurement, the second gain adjustment and the second output power measurement.

13. The transmit power control system according to claim 11, wherein:

if the second gain provided by the second signal path is determined to be not lower than (Gmax−BO), the gain adjustment circuit assigns the first signal path in the next time slot for the first gain adjustment, the first output power measurement, the second gain adjustment and the second output power measurement.

14. The transmit power control system according to claim 10, wherein:
if in the current time slot, the second signal path is assigned in the first gain adjustment, the first output power measurement, the second gain adjustment and the second output power measurement, then the transmit power control system determines whether the second gain provided by the second signal path is lower than (Gmax−BO), wherein the second output power and the second gain provided by the second signal path are lower than the first output power and the first gain provided by the first signal path, respectively, and Gmax refers to a maximum gain of the second signal path, and BO refers to a total gain error in the first gain adjustment.

15. The transmit power control system according to claim 14, wherein:
if the second gain provided by the second signal path is determined to be lower than (Gmax−BO), the gain adjustment circuit assigns the second signal path in the next time slot where the first gain adjustment, the first output power measurement, the second gain adjustment and the second output power measurement take place.

16. The transmit power control system according to claim 14, wherein:
if the second gain provided by the second signal path is determined to be not lower than (Gmax−BO), the gain adjustment circuit assigns the first signal path in the next time slot for the first gain adjustment, the first output power measurement, the second gain adjustment and the second output power measurement.

17. The transmit power control system according to claim 11, wherein,
in determining whether the second gain provided by the second signal path is lower than (Gmax−BO),
the transmit power control system determines whether the second gain of the second signal path in the second gain adjustment in the next time slot is lower than a gain maximum by a gain cover threshold, wherein the gain maximum refers to a gain maximum provided by the second signal path and the gain cover threshold refers to a total allowable gain error in the first gain adjustment in the next time slot.

18. The transmit power control system according to claim 17, wherein,
if the transmit power control system determines that the second gain of the second signal path in the second gain adjustment in the next time slot is lower than the gain maximum by the gain cover threshold, the transmit power control system determines that the second gain provided by the second signal path is lower than (Gmax−BO); and
if the transmit power control system determines that the gain of the second signal path in the second gain adjustment in the next time slot is not lower than the gain maximum by the gain cover threshold, the transmit power control system determines that the second gain provided by the second signal path is not lower than (Gmax−BO).

19. A method comprising:
providing a first signal path and a second signal path in a mobile telecommunications device, wherein the first signal path provides a first output power and a first gain, the second signal path provides a second output power and a second gain;
in a time slot, assigning one of the first and the second signal paths in the mobile telecommunications device for a first gain adjustment and a first output power measurement, wherein the first gain adjustment and the first output power measurement are performed on an output signal generated by the mobile telecommunications device in the time slot; and
in the same time slot, assigning the same one of the first and the second signal paths in the mobile telecommunications device for at least a second gain adjustment and a second output power measurement, wherein the second gain adjustment and the second output power measurement are performed on the output signal in the time slot,
wherein in the same time slot, the first gain adjustment and the first output power measurement in the mobile telecommunications device are performed before the second gain adjustment and the second output power measurement in the mobile telecommunications device.

* * * * *